US009049531B2

(12) United States Patent
Groh

(10) Patent No.: US 9,049,531 B2
(45) Date of Patent: Jun. 2, 2015

(54) METHOD FOR DUBBING MICROPHONE SIGNALS OF A SOUND RECORDING HAVING A PLURALITY OF MICROPHONES

(75) Inventor: Jens Groh, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 401 days.

(21) Appl. No.: 13/509,473

(22) PCT Filed: Nov. 2, 2010

(86) PCT No.: PCT/EP2010/066657
§ 371 (c)(1), (2), (4) Date: May 29, 2012

(87) PCT Pub. No.: WO2011/057922
PCT Pub. Date: May 19, 2011

(65) Prior Publication Data

US 2012/0237055 A1 Sep. 20, 2012

(30) Foreign Application Priority Data

Nov. 12, 2009 (DE) ........................ 10 2009 052 992

(51) Int. Cl.
*H04M 11/00* (2006.01)
*H04S 3/00* (2006.01)
*H04H 60/04* (2008.01)

(52) U.S. Cl.
CPC ................ *H04S 3/008* (2013.01); *H04H 60/04* (2013.01)

(58) Field of Classification Search
CPC .. H04R 3/005; H04R 1/406; H04R 2201/401; H04R 2201/403; H04R 25/407
USPC .................................................... 381/92, 355
See application file for complete search history.

(56) References Cited

U.S. PATENT DOCUMENTS 5,228,093 A 7/1993 Agnello
6,339,758 B1 * 1/2002 Kanazawa et al. ............ 704/226
(Continued)

FOREIGN PATENT DOCUMENTS

CN 1333994 A 1/2002
CN 1761998 A 4/2006
(Continued)

OTHER PUBLICATIONS

Bernfried Runow, *Automatischer Stereo-Downmix Von 5.1-Mehrkanalproduktionen,* Diplomarbeit, Hochschule Der Medien Stuttgart, Jul. 6, 2008, Chapter 7, XP002568518, English translation.
(Continued)

*Primary Examiner* — Simon Sing
(74) *Attorney, Agent, or Firm* — Workman Nydegger

(57) ABSTRACT

In order to compensate tonal changes arising from a multi-path propagation of sound portions during the mixing of multi microphone audio recordings as far as possible it is suggested to form spectral values of respectively overlapping time frames of samples of each a first microphone signal (100) and a second microphone signal (101). The spectral values (300) of the first microphone signal (100) are distributed with formation of spectral values (311) of a first sum signal to the spectral values (301) of a second microphone signal (101) in a first summing level (310), whereat a dynamic correction of the spectral values (300, 301) of one of the two microphone signals (100, 101) occurs. Spectral values (399) of a result signal are formed out of the spectral values (311) of the first sum signal which are subject to an inverse Fourier-transformation and a block junction (FIG. 3).

13 Claims, 6 Drawing Sheets

(56) References Cited

U.S. PATENT DOCUMENTS

| | | | | |
|---|---|---|---|---|
| 6,668,062 | B1 * | 12/2003 | Luo et al. | 381/122 |
| 7,171,007 | B2 * | 1/2007 | Rajan | 381/92 |
| 7,315,623 | B2 * | 1/2008 | Gierl et al. | 381/71.12 |
| 7,327,852 | B2 * | 2/2008 | Ruwisch | 381/356 |
| 7,995,767 | B2 * | 8/2011 | Amada | 381/18 |
| 8,090,111 | B2 | 1/2012 | Aichner et al. | |
| 8,170,882 | B2 | 5/2012 | Davis | |
| 8,275,147 | B2 * | 9/2012 | Beavis et al. | 381/92 |

FOREIGN PATENT DOCUMENTS

| | | | |
|---|---|---|---|
| CN | 1926607 | A | 3/2007 |
| CN | 101484938 | A | 7/2009 |
| EP | 1 133 899 | B1 | 8/2008 |
| WO | 2004/084185 | A1 | 9/2004 |
| WO | WO 2005/086139 | | 9/2005 |

OTHER PUBLICATIONS

Bernfried Runow, *Automatischer Stereo-Downmix Von 5.1-Mehrkanalproduktionen,* Diplomarbeit, Hochschule Der Medien Stuttgart, Jul. 6, 2008, Seiten 1-150, XP002568518.

International Search Report issued Apr. 13, 2011 in PCT Application No. PCT/EP2010/066657, filed Nov. 2, 2010.

International Preliminary Report issued issued Apr. 13, 2011 in PCT Application No. PCT/EP2010/066657, filed Nov. 2, 2010 (English translation).

Bernfried Runow, *Automatic Stereo Down Mix of Multichannel Productions,* Diplomarbeit, Jul. 6, 2008, pp. 42-117 (url:http://www.b-public.de/da/da_runow_downmix.pdf).

* cited by examiner

"Prior Art"

"Prior Art"

METHOD FOR DUBBING MICROPHONE SIGNALS OF A SOUND RECORDING HAVING A PLURALITY OF MICROPHONES

FIELD OF THE INVENTION

The invention relates to a method for mixing microphone signals of an audio recording with a plurality of microphones.

Background and Objects of Invention

It is recognized ("Handbuch der Tonstudiotechnik" by Michael Dickreiter et al., ISBN 978-3598117657, pp. 211-212, 230-235, 265-266, 439, 479) to use several microphones instead of a single microphone in order to capture vast acoustic sceneries during the production of audio recordings for canned music, films, broadcasting, sound archives, computer games, multi-media presentations or websites. Therefore the term "multi-microphone audio recording" is generally used. A vast acoustic scenery may be, e.g., a concert hall with an orchestra of several musical instruments. In order to capture tonal details each individual instrument is recorded with an individual microphone positioned closely to the instrument and, in order to record the overall acoustics including the echoes in the concert hall and audience noises (applause in particular), additional microphones are positioned in a greater distance.

Another example of a vast acoustic scenery is a drum set consisting of several pulsatile instruments which is recorded in a recording studio. For a "multi-microphone audio recording" individual microphones are positioned near each pulsatile instrument and an additional microphone is installed above the drummer.

Such multi-microphone recordings allow for a maximized number of acoustic and tonal details along with the overall acoustics of the scenery to be captured in a high quality and to shape them aesthetically satisfactory. Each microphone signal of the several microphones is usually recorded as a multi-trace recording. During the following mixing of the microphone signals further creative work is done. In special cases it is possible to mix immediately "live" and only record the product of the mixing.

The creative goals of the mixing process are generally the balance of volumes of all sound sources, a natural sound and a reality-like spatial impression of the overall acoustics.

During the common mixing technique in an audio mixing console or in the mixer function of digital editing systems, a sum of the added microphone signals is produced, conducted by a summing unit ("bus") which is a technical realization of a common mathematical addition. In FIG. 1 a single summation in the signal path of a common mixing console or a digital editing system is exemplified. In FIG. 2 a series connection of summations in the summing unit ("bus") in the signal path of a common mixing console or a digital editing system is exemplified. The reference numbers of FIGS. 1 and 2 are as follows:

100 a first microphone signal
101 a second microphone signal
110 a summation level based on an addition
111 a sum signal
199 a result signal
200 an $n^{th}$ sum signal
201 an $n+2^{th}$ microphone signal
210 an $n+1^{th}$ summation level based on an addition
211 an $n+1^{th}$ sum signal With the multi-microphone audio recording at least two microphone signals contain portions of sound which originate from the same sound source due to the ineluctable multipath propagation of sound. As these portions of sound reach the microphones with varying delays due to their varying sound paths a comb-filter effect occurs with the common mixing technique in the summing unit which can be heard as sound changes and which run counter to the intended natural sound. In the common mixing technique those sound changes based on comb-filter effects can be reduced by an adjustable amplification and a possible adjustable delay of the recorded microphone signals. However, such a reduction is only restrictively possible in case of a multipath propagation of sound from more than a single sound source. In any case a significant adjustment of the mixing console or the digital editing system is required for figuring out the best compromise.

In the earlier DE 10 2008 056 704 a down-mixing (so-called "downmixing") for the production of a two-channel audio format from a multi-channel (e.g., five-channel) audio format is described which projects phantom audio sources. Here two input signals are summed up, wherein a loading with a corrective factor of the spectral coefficients of one of the two input signals to be summed up is conducted; the input signal which is loaded with the corrective factor is prioritized over the other input signal. The determination of the corrective factor as described in DE 10 2008 056 704, however, leads to possibly audible disturbing ambient noises in cases in which the amplitude of the prioritized signal over the non-prioritized signal is low. The likelihood of occurrence of such disturbances is low, but it cannot be manipulated.

A method of mixing microphone signals of an audio recording with several microphones is known from WO 2004/084 185 A1 in which spectral values of overlapping time windows of samples of a first microphone signal and a second microphone signal respectively are generated. The spectral values of the first microphone signal are distributed onto the spectral values of the second microphone signal in a first summation level, wherein a dynamic correction of the spectral values of one of the microphone signals is conducted. Spectral values of a result signal are made up of the spectral values of the first summation signal which are subject to an inverse Fourier-transformation and block junction. Thus, for every block of samples individual corrective factors can be determined. The dynamic correction by a signal depending loading of spectral coefficients instead of a common addition reduces unwanted comb-filter effects during multi-microphone mixing which occur in the summing element of the mixing console or editing system due to common addition. However, with this method disturbing ambient noises are audible if the amplitude of the prioritized signal is low compared to that of the non-prioritized signal.

The task of the invention is to compensate the tonal change which occurs due to multipath propagation of sound portions during the mixing of multi-microphone recordings as far as possible.

BRIEF DESCRIPTION OF THE DRAWINGS

The invention is described by means of the embodiments given in the figures wherein.

Figure 1:
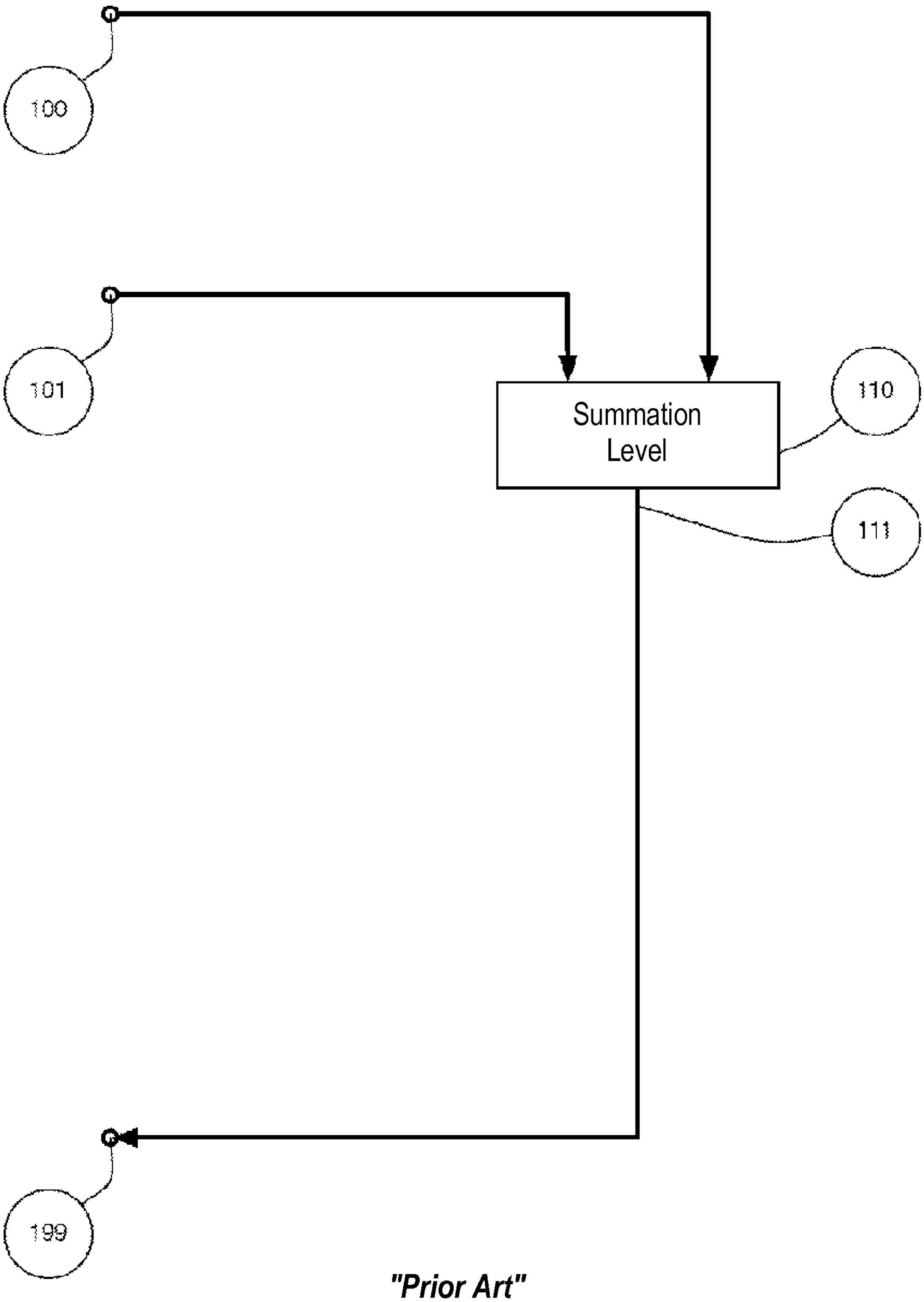
FIG. 1 shows a block diagram of a single summation in a signal path of a common mixing console or a digital editing system.
Figure 2:
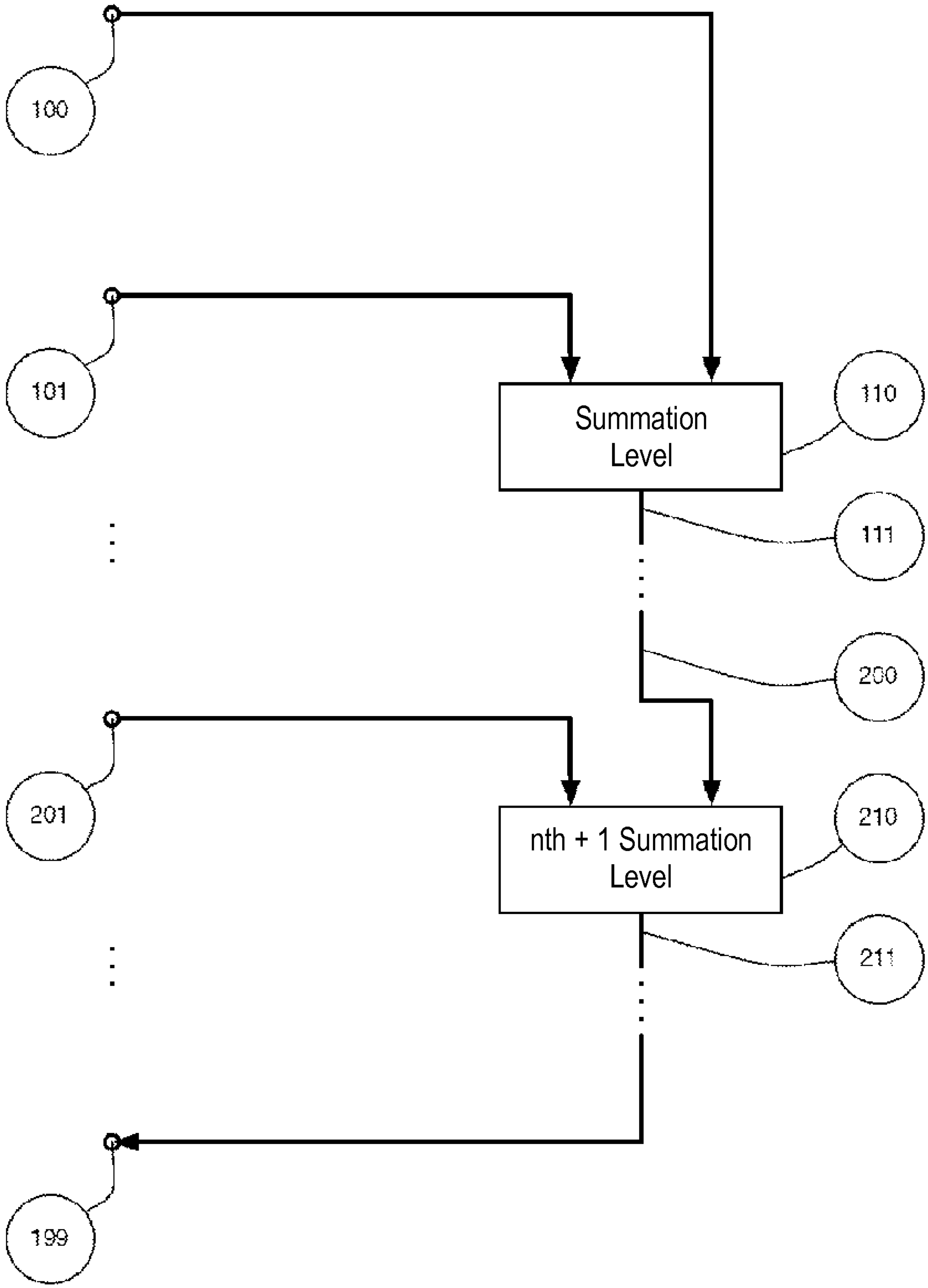
FIG. 2 shows a block diagram of a series connection of summations in a summing unit ("bus") in a signal path of a common mixing console or a digital editing system.

The reference numbers of FIGS. 1 and 2 are as follows:

100 a first microphone signal
101 a second microphone signal
199 a result signal
201 an $n+2^{th}$ microphone signal
300 spectral values of the first microphone signal
301 spectral values of the second microphone signal
310 a first summing level
311 spectral value of a first sum signal
320 a block-building and spectral transformation unit
330 an inverse spectral transformation and block junction unit
399 spectral values of a result signal
400 spectral values of an $n^{th}$ sum signal
401 spectral values of an $n+2^{th}$ microphone signal
410 an $n+1^{th}$ summing level
411 spectral values of an $n+1^{th}$ sum signal
500 allocation unit
501 spectral values A(k) of the prioritized signal
502 spectral values B(k) of the non-prioritized signal
510 calculation unit for corrective factor values
511 corrective factor values m(k)
520 multiplier-summer unit
700 an $n^{th}$ building group consisting of unit 320 and the $n+1^{th}$ summing level 410.

DETAILED DESCRIPTION OF THE PREFERRED EMBODIMENTS

Figure 3:
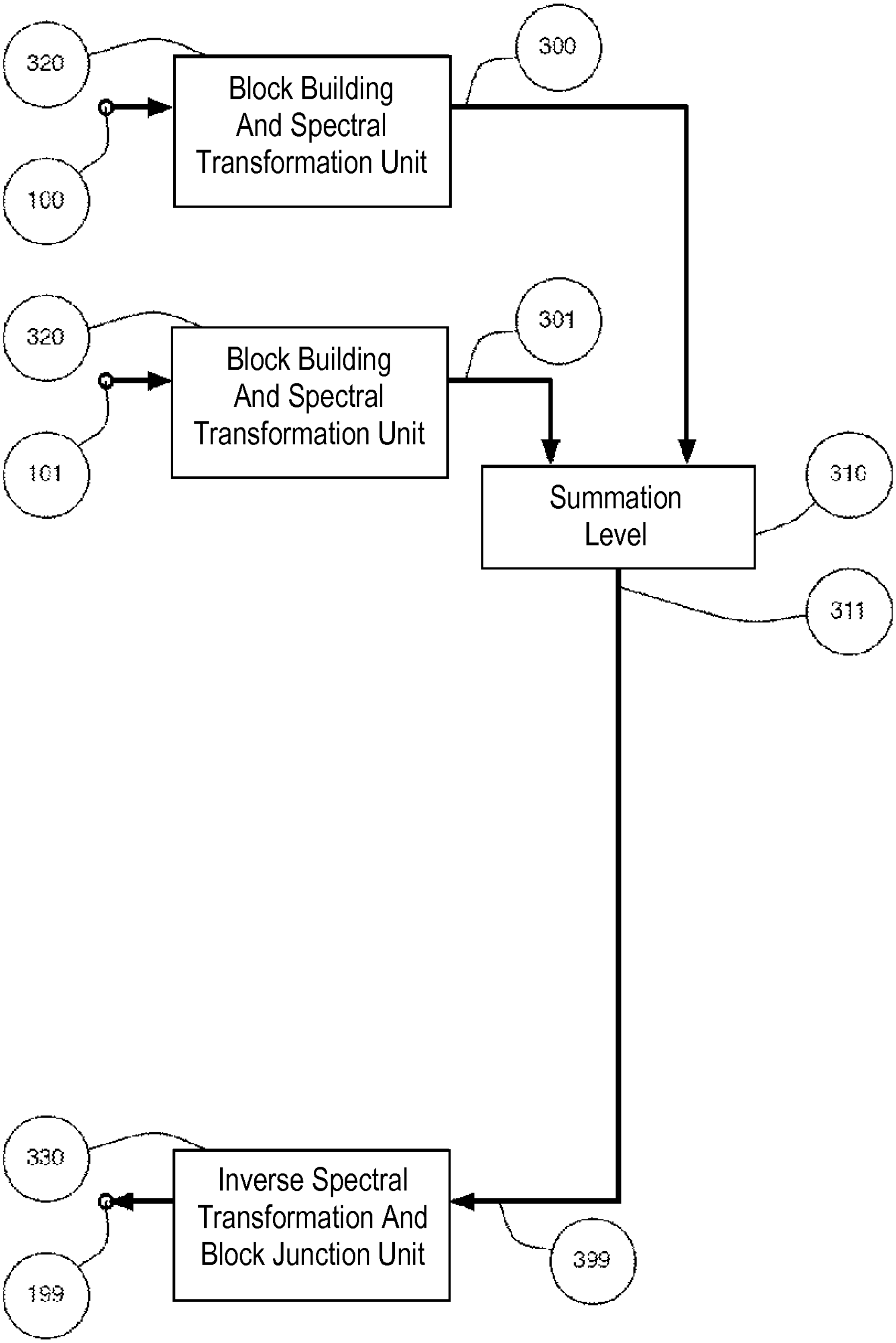
FIG. 3 shows a general block diagram of an arrangement for the conducting of the method according to the invention.

FIG. 3 shows a general block diagram of an arrangement for the conduction of the method according to the invention. A first microphone signal 100 and a second microphone signal 101 are lead to a dedicated block building and spectral transformation unit 320 respectively. In units 320 the microphone signals 100 and 101 are first divided into temporally overlapping signal segments, after what the built blocks undergo a Fourier-transformation. This results in the spectral values 300 of the first microphone signal 100 and the spectral values 301 of the second microphone signal 101 respectively at the outputs of blocks 320. The spectral values 300 and 301 are subsequently fed into a first summing level 310 which creates the spectral values 311 of a first sum signal from the spectral values 300 and 301. The spectral values 311 form at the same time the spectral values 399 of a result signal, which are first subject to an inverse Fourier-transformation in unit 330. The so-formed spectral values are subsequently merged into blocks. The hence resulting blocks of temporally overlapping signal segments are accumulated to the result signal 199.

Figure 4:
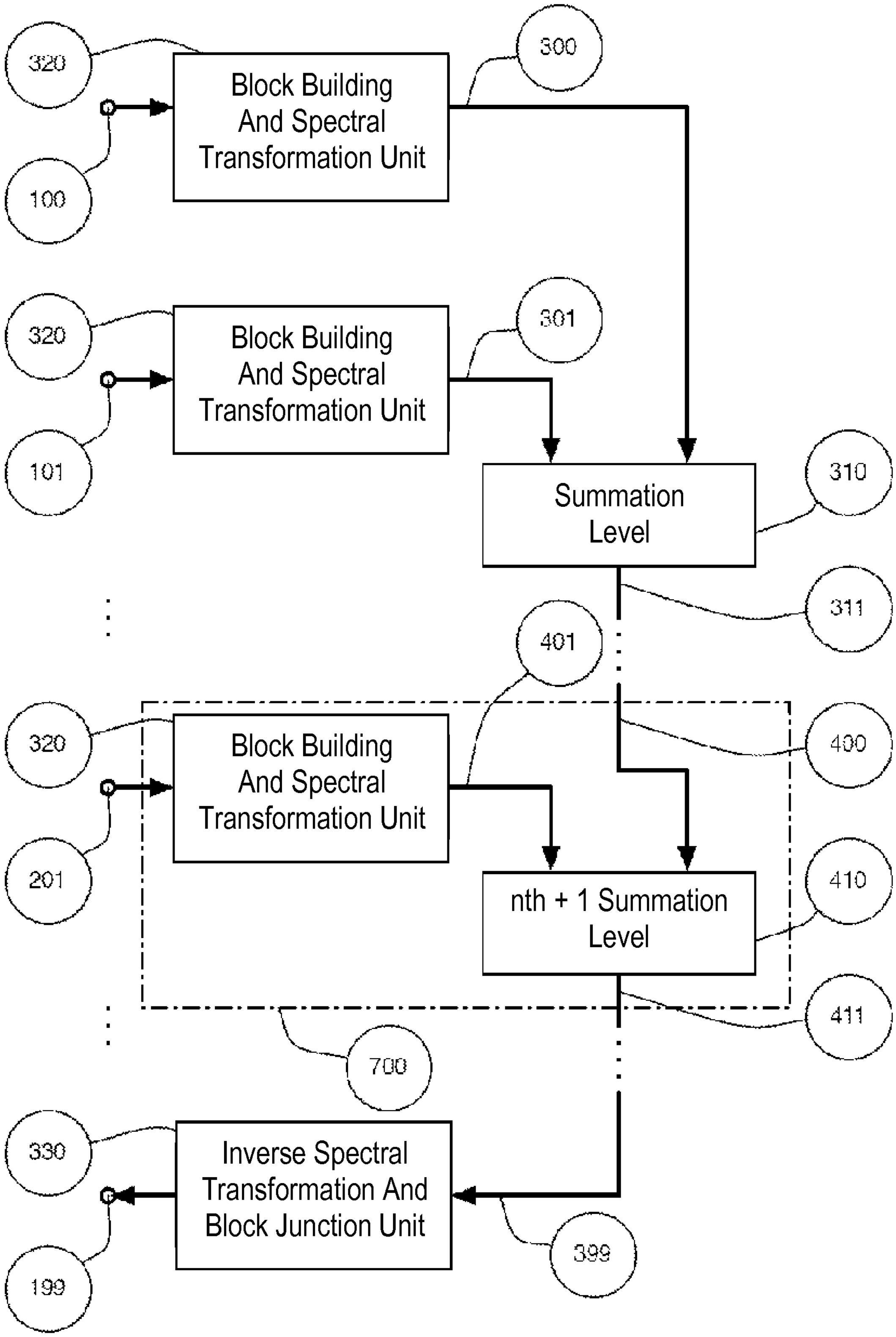
FIG. 4 shows a similar block diagram as FIG. 3, but with the difference of having the first summing level enhanced by a number of additional summing levels.

The block diagram shown in FIG. 4 is constructed similarly to the block diagram in FIG. 3, but with the main difference that spectral values 399 are not at the same time the spectral values 311. In fact, in FIG. 4 a connection series of one or more equal building groups 700 from each a block building and spectral transformation unit 320 and an $n+1^{th}$ summing level 410 is inserted between the spectral values 311 and the spectral values 399. For simplification purposes FIG. 4 only shows a single building group 700 of the building group 700 in the block diagram, which is described below, wherein the number index n serves as a serial number. The connection series of building groups 700 mentioned above are to be understood in a way that the spectral values 400 form at the same time the spectral values of the first sum signal 311 at the beginning of the connection series, and the spectral values 411 form at the same time the spectral values of the result signal 399 at the end of the connection series. For all other sections of the connection series the spectral values 411 of a summing level 410 form at the same time the spectral values 400 of the following summing level 410. An $n+2^{th}$ microphone signal 201 is fed into each block building and spectral transformation unit 320 of a building group 700 of the connection series, in which it is divided into segments of temporally overlapping signal sections. The resulting blocks of temporally overlapping signal segments are Fourier transformed, resulting in the spectral values 401 of the $n+2^{th}$ microphone signal. The spectral values 400 of the $n^{th}$ sum signal and the spectral values 401 of the $n+2^{th}$ microphone signal are then fed in the $n+1^{th}$ summing level 410, which then produces the spectral values 411 of the $n+1^{th}$ sum signal from them.

Figure 5:
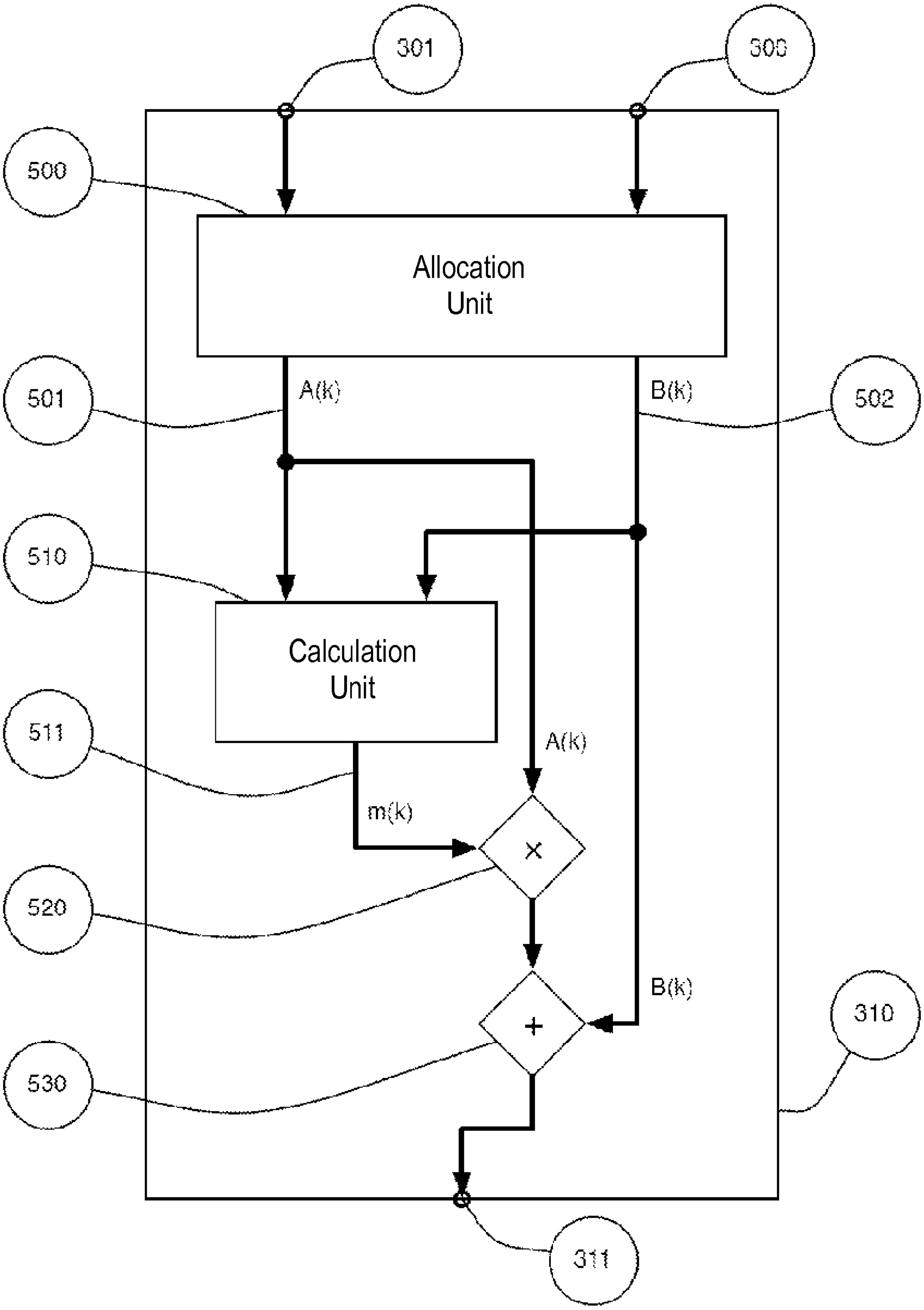
FIG. 5 shows a block diagram of the first summing level as intended in FIGS. 3 and 4.

FIG. 5 shows the details of the first summing level 310. In summing level 310 the spectral values 300 of the first microphone signal 100 and the spectral values 301 of the second microphone signal 101 are fed into an allocation unit 500 in which a prioritization of the output signals 501, 502 of the unit 500 occurs depending on the choice of the producer or the user. Two alternative allocations are possible: When prioritizing the output signal 501 the spectral values A(k) of the signal 501 to be prioritized are allocated to the spectral values 301 and the spectral values B(k) of the signal 502 not to be prioritized are allocated to the spectral values 300. Alternatively, the spectral values A(k) of the signal 501 to be prioritized are allocated to the spectral values 300 and the spectral values B(k) of the signal 502 not to be prioritized. The choice of the allocation of prioritization determines the spatial impression of the overall acoustics, and is made according to the creative demands. A typical possibility is to allocate the signals of those microphones intended to gather the overall acoustics (so-called main microphones) or sum signals formed according to the invention to the prioritized signal path, and to allocate the signals of those microphones placed near the sound sources (so-called supportive microphones) to the non-prioritized signal path. The allocated spectral values A(k) of the signal to be prioritized 501 and the spectral values B(k) of the signal not to be prioritized 502 are then fed into a calculation unit 510 for the corrective factor values m(k), which calculates the corrective factor values m(k) from the spectral values A(k) and B(k) as output signal 511 as follows. Either the corrective factor m(k) is calculated as follows:

$$eA(k)=\mathrm{Real}(A(k))\cdot\mathrm{Real}(A(k))+\mathrm{Imag}(A(k))\cdot\mathrm{Imag}(A(k))$$

$$x(k)=\mathrm{Real}(B(k))\cdot\mathrm{Real}(B(k))+\mathrm{Imag}(A(k))\cdot\mathrm{Imag}(A(k))$$

$$w(k)=D\cdot x(k)/eA(k)$$

$$m(k)=(w(k)^2+1)^{(1/2)}-w(k)$$

or the corrective factor m(k) is calculated as follows:

$$eA(k)=\mathrm{Real}(A(k))\cdot\mathrm{Real}(A(k))+\mathrm{Imag}(A(k))\cdot\mathrm{Imag}(A(k))$$

$$eB(k)=\mathrm{Real}(B(k))\cdot\mathrm{Real}(B(k))+\mathrm{Imag}(B(k))\cdot\mathrm{Imag}(B(k))$$

$$x(k)=\mathrm{Real}(B(k))\cdot\mathrm{Real}(B(k))+\mathrm{Imag}(A(k))\cdot\mathrm{Imag}(A(k))$$

$$w(k)=D\cdot x(k)/eA(k)+L\cdot eB(k))$$

$$m(k)=(w(k)^2+1)^{(1/2)}-w(k)$$

wherein it means that m(k) is the $k^{th}$ corrective factor

A(k) is the $k^{th}$ spectral value of the signal to be prioritized

B(k) is the $k^{th}$ spectral value of the signal not to be prioritized

D is the grade of compensation

L is the grade of the limitation of the compensation

Grade D of compensation is a numeric value which determines in how far the sound changes due to comb-filter effects are balanced. It is chosen according to the creative demand and the intended tonal effect and is advantageously in the rage of 0 to 1. If D=0 the sound equals exactly the sound of conventional mixing. If D=1 the comb-filter effect is completely removed. For values of D between 0 and 1 the tonal result is accordingly between the ones for D=0 and D=1.

Grade L of the limitation of the compensation is a numeric value which determines in how far the probability of the occurrence of disturbing ambient noises is reduced. Said probability is given when the amplitude of the microphone signal to be prioritized is low in contrast to the microphone signal not to be prioritized. L>=0 is valid. If L=0 not reduction of the probability of disturbing ambient noises is given. Grade L is to be chosen that according to experience just as no more ambient noises can be heard. Typically grade L is of the order of 0.5. The bigger grade L the smaller the probability of ambient noises, but the balance of tonal changes as adjusted by D may also be reduced.

The spectral value A(k) of the signal to be prioritized 501 is additionally lead to a multiplier 520, whereas the spectral values B(k) of the signal not to be prioritized 502 is additionally lead into a summer 530. Furthermore, the corrective factor values m(k) of the output signal 511 are fed into the calculation unit 510 where they are multiplied complexly (according to real part and imaginary part) with the spectral values A(k) 501. The resulting values of the multiplier 520 are fed into the summer 530 where they are added complexly (according to real part and imaginary part) to the spectral values B(k) of the signal not to be prioritized 502. This results in the spectral values 311 of the first sum signal of the first summing level 310.

What is important for the prioritization is the multiplication of the corrective factor m(k) with exactly one of the two summands of the addition conducted in the summer 530. Thus, the complete signal path of this summand is "prioritized" from the microphone signal input to the summer 530.

Figure 6:
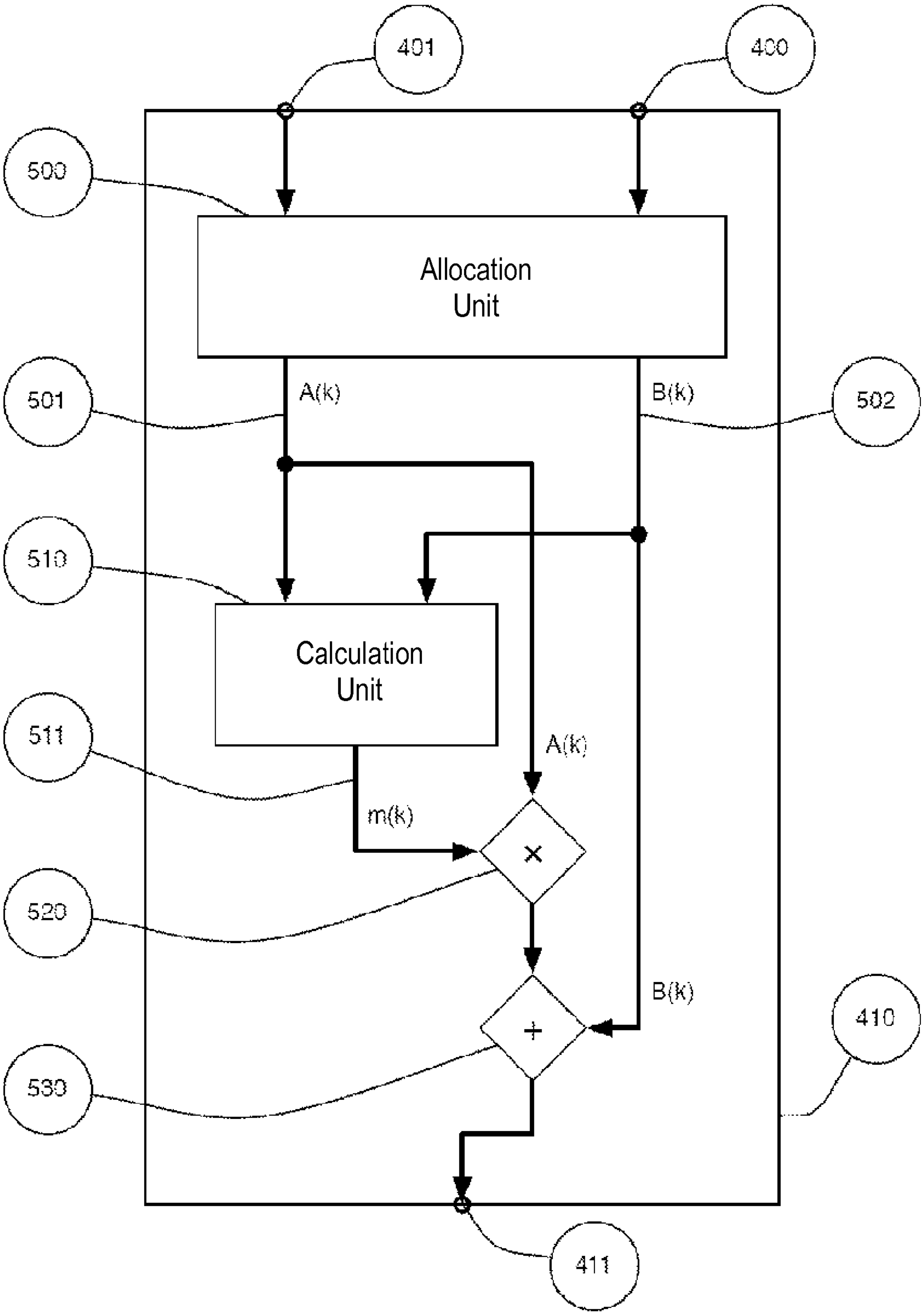
FIG. 6 shows a block diagram of a further summing level as intended in FIG. 4.

FIG. 6 shows the details of the $n+1^{th}$ summing level 410. The $n+1^{th}$ summing level 410 is similar to the first summing level 310 in its construction, but with the difference that here the spectral values 400 of the $n^{th}$ sum signal and the spectral values 401 of the $n+2^{th}$ microphone signal are fed into the allocation unit 500; furthermore, that the result values of the summer 530 form the spectral values of the $n+1^{th}$ sum signal.

It is apparent that this invention does not only refer to microphone signals but generally to every audio signal facing the problem described above.

Accordingly the input signals can be general audio signals which originate from audio recordings, which are available in the form of audio files or sound tracks which were saved for further editing in a storage.

Additionally the invention can be implemented in different ways, such as, e.g., a software, which runs on a computer, hardware, a combination thereof and/or a special circuit.

The invention claimed is:

1. A method for mixing microphone signals of an audio recording with a plurality of microphones (multi-microphone audio recording), wherein a multipath propagation of sound portions is given and a first microphone signal and a second microphone signal are subject to the building of blocks of samples and a Fourier-transformation, wherein the spectral values of the respective microphone signal are generated, the spectral values of the first microphone signal are distributed onto the spectral values of the second microphone signal in a first summing level while forming spectral values of a first sum signal, wherein a dynamic correction of the spectral values of one of the two microphone signals occurs, the spectral values of the first sum signal constitute spectral values of a result value, and the spectral values of the result value undergo an inverse Fourier-transformation and the junction of blocks of samples, wherein a result signal is generated, wherein in order to generate the spectral values of the first sum signal of the spectral values of the first microphone signal and the spectral values of the second microphone signal the spectral values of one of the two signals can be chosen, which is to be prioritized over the other signal, the spectral values (A(k)) of the signal to be prioritized are multiplied with the respective corresponding corrective factors m(k), and that the spectral values (B(k)) of the signal not to be prioritized and the corrected spectral values m(k)·A(k) of the signal to be prioritized are added while forming spectral values of the result signal, wherein the calculation of the corrective factors m(k) is as follows:

$$eA(k)=\mathrm{Real}(A(k))\cdot\mathrm{Real}(A(k))+\mathrm{Imag}(A(k))\cdot\mathrm{Imag}(A(k))$$

$$eB(k)=\mathrm{Real}(B(k))\cdot\mathrm{Real}(B(k))+\mathrm{Imag}(B(k))\cdot\mathrm{Imag}(B(k))$$

$$x(k)=\mathrm{Real}(A(k))\cdot\mathrm{Real}(B(k))+\mathrm{Imag}(A(k))\cdot\mathrm{Imag}(B(k))$$

$$w(k)=D\cdot x(k)/(eA(k)+L\cdot eB(k))$$

$$m(k)=(w(k)^2+1)(^{1/2})-w(k)$$

and m(k) is the $k^{th}$ corrective factor and

A(k) is the $k^{th}$ spectral value of the signal to be prioritized and

B(k) is the $k^{th}$ spectral value of the signal not to be prioritized and

D is the grade of compensation and

L is the grade of limitation of the compensation.

2. The method according to claim 1, wherein the first summing level is expanded by a number N of additional summing levels;

wherein respectively during the $n+1^{th}$ summing level an $n+2^{th}$ microphone signal undergoes a formation of blocks of samples and a Fourier-transformation, whereat the spectral values of the $n+2^{th}$ microphone signal are generated, wherein during the $n+1^{th}$ summing level the spectral values of the $n^{th}$ sum signals are distributed to the spectral values of the $n+2^{th}$ microphone signal with generation of the spectral values of an $n+1^{th}$ sum signal, wherein a dynamic correction of either the spectral values of the $n^{th}$ summing level or the spectral values of the $n+2^{th}$ microphone signal occurs, wherein respectively during the $n+1^{th}$ summing level of spectral values of the $n^{th}$ sum signal and the spectral values of the $n+2^{th}$ microphone signal the spectral values of the two signals is chosen to be prioritized over the other signals, wherein n=[1 . . . N] is the serial number of the summing level and N is the amount of expanded summing levels.

3. The method according to claim 1, wherein grade D of the compensation is a numeric value which determines in how far the sound changes due to comb-filter effects are balanced, wherein the value of D is chosen according to the creative demand and the intended tonal effect.

4. The method according to claim 3, wherein the value for grade D is in the range of 0 to 1, wherein for D=0 the sound is exactly the sound of conventional mixing and for D=1 the comb-filter effect is completely removed.

5. The method according to one of the claim 1, wherein grade L of the limitation of the compensation is a numeric value which determines in how far the probability of the occurrence of disturbing ambient noises is reduced, wherein this probability is given when the amplitude of the microphone signal to be prioritized is low in contrast to the microphone signal not to be prioritized.

6. The method according to one of the claim 1, wherein grade L of the limitation of the compensation is bigger than or equal to zero, wherein for L=0 no reduction of the probability of disturbing ambient noises is given and the grade L is chosen according to experience so that just no more ambient noises can be heard.

7. The method according to claim 1, wherein grade L of the limitation of the compensation has a value of about 0.5.

8. A mixing circuit for mixing the first and second tonal signals and for producing a result signal, comprising a first input for reception of the first tonal signal, a second input for reception of the second tonal signal, an output for setting out the result signal, a combination circuit with first and second inputs coupled with the first or respectively the second input of the mixing circuit and an output coupled with the output of the mixing circuit, the combination circuit comprising:

a calculation unit a multiplication circuit a signal combination unit, wherein the inputs of the combination circuit are coupled with a first and second input of the calculation unit, wherein an output of the calculation unit is coupled with a first input of the multiplication circuit, in that a first input of the mixing circuit is coupled with a second input of the multiplication circuit, wherein an output of the multiplication circuit is coupled with a first input of the signal combination unit, wherein one of the two inputs of the mixing circuit is coupled with a second input of the signal combination unit, wherein an output of the signal combination unit is coupled with the output of the combination circuit, and wherein the calculation unit is equipped for deriving a multiplication factor (m(k)) depending on the signals at the inputs of the calculation unit, wherein the calculation unit is set up to calculate m(k) as follows:

$$m(k)=[(w(k)2+1]^{(1/2)}-w(k),$$

wherein $$w(k)=D*x(k)/[(eA(k)+L*eB(k)]$$

with $$x(k)=\mathrm{Real}[(A(k)]*\mathrm{Real}[(B(k)]+\mathrm{Imag}[(A(k)]*\mathrm{Imag}[(B(k)]$$

and $$eA(k)=\mathrm{Real}[(A(k)]*\mathrm{Real}[(A(k)]+\mathrm{Imag}[(A(k)]*\mathrm{Imag}[(A(k)]$$

and $$eB(K)=\mathrm{Real}[(B(k)]*\mathrm{Real}[(B(k)]+\mathrm{Imag}[(B(k)]*\mathrm{Imag}[(B(k)],$$

wherein

A(k) is the $k^{th}$ spectral value of the signal which is offered at the second input of the multiplication circuit, B(k) is the $k^{th}$ spectral value of the signal which is offered at the second input of the signal combination unit, L is a constant whose value is adjustable, and D is a constant whose value is adjustable.

9. The mixing circuit according to claim 8, wherein a first and second tonal signal and the result signal are converted signals within the frequency range, and the mixing circuit is furthermore equipped with time-frequency-converters between the inputs of the mixing circuit and the inputs of the combination circuit and with a frequency-time-converter between the output of the combination circuit and the output of the mixing circuit, and wherein the multiplication factor is a frequency dependent multiplication factor (m(k)), wherein k is a frequency parameter.

10. The mixing circuit according to claim 8, wherein the combination circuit comprises furthermore an allocation unit for allocation of the signal at the first input of the combination circuit to the second input of the multiplication circuit or the second input of the signal combination unit and for allocation of the signal of the second input of the combination circuit to the second input of the signal combination unit or the second input of the multiplication circuit.

11. The mixing circuit according to claim 8, wherein 0≤D ≤is valid for D.

12. The mixing circuit according to claim 8, wherein L ≥0 is valid for L.

13. The mixing circuit according to claim 8, wherein L is approximately equal to 0.5.

* * * * *